United States Patent
Lindemann

(10) Patent No.: US 8,063,694 B2
(45) Date of Patent: Nov. 22, 2011

(54) BUS LOOP POWER INTERFACE AND METHOD

(75) Inventor: Stig Lindemann, Aarhus N (DK)

(73) Assignee: Micro Motion, Inc., Boulder, CO (US)

( * ) Notice: Subject to any disclaimer, the term of this patent is extended or adjusted under 35 U.S.C. 154(b) by 475 days.

(21) Appl. No.: 12/297,237

(22) PCT Filed: Apr. 28, 2006

(86) PCT No.: PCT/US2006/016439
§ 371 (c)(1),
(2), (4) Date: Oct. 15, 2008

(87) PCT Pub. No.: WO2007/130017
PCT Pub. Date: Nov. 15, 2007

(65) Prior Publication Data
US 2009/0278519 A1  Nov. 12, 2009

(51) Int. Cl.
G05F 1/10 (2006.01)
(52) U.S. Cl. .................... 327/541; 340/310.06
(58) Field of Classification Search .............. 326/30–34, 326/62; 327/541, 543; 324/762.01, 750.03; 340/12.37, 870.18, 870.07, 310.06
See application file for complete search history.

(56) References Cited

U.S. PATENT DOCUMENTS

| | | | |
|---|---|---|---|
| 5,451,023 A | 9/1995 | Johnston | |
| 5,451,923 A | 9/1995 | Seberger et al. | |
| 5,684,451 A * | 11/1997 | Seberger et al. | 340/12.37 |
| 6,025,793 A | 2/2000 | Kah | |
| 6,233,285 B1 | 5/2001 | Beaudoin et al. | |
| 6,311,136 B1 | 10/2001 | Henry et al. | |
| 6,466,188 B1 | 10/2002 | Cato | |
| 6,662,120 B2 | 12/2003 | Drahm et al. | |
| 6,799,476 B2 | 10/2004 | Brockhaus | |
| 6,907,082 B1 | 6/2005 | Loechner | |
| 6,933,746 B1 | 8/2005 | Creek | |

FOREIGN PATENT DOCUMENTS

SU  1432244 A1  10/1988

* cited by examiner

Primary Examiner — Rajnikant Patel
(74) Attorney, Agent, or Firm — The Ollila Law Group LLC

(57) ABSTRACT

A bus loop power interface (100) is provided according to the invention. The bus loop power interface (100) comprises a voltage control module (110) receiving a loop voltage $V_{LOOP}$ and generating a predetermined supply voltage $V_{SUPPLY}$, an impedance control module (120) coupled to the voltage control module (110), with the impedance control module (120) receiving a loop current $I_{LOOP}$ and generating a predetermined supply current $I_{SUPPLY}$, and a feedback (115) coupled between the voltage control module (110) and the impedance control module (120). The feedback (115) provides a feedback signal to the voltage control module (110) that enables the voltage control module (110) to substantially maintain the predetermined supply voltage $V_{SUPPLY}$.

30 Claims, 4 Drawing Sheets

BUS LOOP POWER INTERFACE AND METHOD

BACKGROUND OF THE INVENTION

1. Field of the Invention

The present invention relates to a bus loop power interface, and more particularly, to a bus loop power interface and method for an instrumentation bus.

2. Statement of the Problem

Flowmeters are used to measure the mass flow rate, density, and other characteristics of flowing materials. The flowing materials can comprise liquids, gases, combined liquids and gases, solids suspended in liquids, and liquids including gases and suspended solids. For example, flowmeters are widely used in the well production and refining of petroleum and petroleum products. A flowmeter can be used to determine well production by measuring a flow rate (i.e., by measuring a mass flow through the flowmeter), and can even be used to determine the relative proportions of the gas and liquid components of a flow.

In many process control or industrial automation settings, a bus loop (or instrumentation bus) is used to connect to various devices, such as sensor devices and other instrument devices. The bus loop is commonly used to deliver electrical power to the various attached instrument or sensor devices. In addition, the bus loop is also commonly used to communicate data both to and from the sensor or instrument device. Therefore, the bus loop is connected to a master device that can provide regulated electrical power over the bus and that can perform communications over the bus. The master device can send commands and/or programming, data, calibrations and other settings, etc., to the sensor and instrument devices. The master device can also receive data from the sensor and instrument devices, including identification data, calibration data, measurement data, operational data, etc.

FIG. 1 shows a two-wire bus loop 1 according to the prior art. The bus loop 1 can include a master device 2 that operates the bus loop 1, multiple sensor or instrument devices 3-5, and terminators 6. The master device 2 can pass digital communication signals to external devices, such as to monitoring and control stations, for example. The master device 2 is connected to an electrical power source and provides electrical power over the two-wire bus loop 1. The master device 2 typically provides electrical power that is current limited, voltage limited, and power limited.

The bus loop 1 can comprise a FIELDBUS bus loop, for example. The term FIELDBUS refers to a two-wire instrumentation bus standard that is typically used to connect together multiple instruments and is further capable of being used to provide digital communications between instruments. Alternatively, the bus loop 1 can comprise other buses, such as PROFIBUS, HART, a 4-20 mA bus loop, etc.

FIG. 2 shows a prior art power regulation scheme for a prior art bus device 3 connected to the bus loop 1. The prior art bus device 3 includes voltage regulator 8 and a load 9 in series with the voltage regulator 8. The voltage regulator 8 maintains a constant voltage level to the load 9.

However, this prior art power regulation has drawbacks. The maximum electrical power (P) provided in this prior art arrangement comprises the output voltage of the series regulator (V) multiplied by the loop current (I). A loop interface that uses this kind of linear regulation has poor power transfer because the voltage parameter V in the available power equation (P=V×I) is essentially fixed. In addition, the bus voltage dips when the loop current increases, due to the relatively high loop impedance.

One possible solution could be the use of a switch mode power supply (SMPS). A SMPS is also referred to as a switched mode power supply or a switching power supply. A SMPS generates a time varying signal from the DC bus voltage, performs a voltage step-up conversion, and converts the resulting time-varying signal back to a DC voltage that can have a higher voltage level than the original DC bus voltage. As a result, the V term in the power equation can be increased.

However, the drawback of a SMPS device is that a SMPS device typically has a low input impedance characteristic. This is not compatible with a device powered from the bus loop 1, where the loop impedance is kept high in order to enable communication signals to pass over the bus loop 1.

SUMMARY OF THE SOLUTION

A bus loop power interface is provided according to an embodiment of the invention. The bus loop power interface comprises a voltage control module receiving a loop voltage $V_{LOOP}$ and generating a predetermined supply voltage $V_{SUPPLY}$, an impedance control module coupled to the voltage control module, with the impedance control module receiving a loop current $I_{LOOP}$ and generating a predetermined supply current $I_{SUPPLY}$, and a feedback coupled between the voltage control module and the impedance control module. The feedback provides a feedback signal to the voltage control module that enables the voltage control module to substantially maintain the predetermined supply voltage $V_{SUPPLY}$.

A bus loop power interface is provided according to an embodiment of the invention. The bus loop power interface comprises a switch mode power supply (SMPS) $U_2$ receiving a loop voltage $V_{LOOP}$ and generating a predetermined supply voltage $V_{SUPPLY}$. The bus loop power interface further comprises a current measuring resistor $R_1$ receiving a loop current $I_{LOOP}$, an op-amp $U_1$ including input terminals across the current measuring resistor $R_1$, and a transistor $Q_1$ biased by the op-amp $U_1$. The transistor $Q_1$ receives the loop current $I_{LOOP}$ and generates a predetermined supply current $I_{SUPPLY}$. The output of the op-amp $U_1$ controls an impedance characteristic of the transistor $Q_1$ and controls the predetermined supply current $I_{SUPPLY}$. The bus loop power interface further comprises a transistor $Q_2$ coupled to the SMPS $U_2$. The transistor $Q_2$ is biased by the loop voltage $V_{LOOP}$. The bus loop power interface further comprises a feedback resistor $R_2$ connected between the transistor $Q_2$ and ground. The feedback resistor $R_2$ receives a feedback current $I_F$ from the transistor $Q_2$. A feedback voltage $V_{FB}$ across the feedback resistor $R_2$ is received by a feedback input FB of the SMPS $U_2$. The transistor $Q_2$ and the feedback resistor $R_2$ enable the SMPS $U_2$ to substantially maintain the predetermined supply voltage $V_{SUPPLY}$.

A method of controlling electrical power in a bus loop power interface is provided according to an embodiment of the invention. The method comprises receiving electrical power from an instrumentation bus at a loop voltage $V_{LOOP}$ and at a loop current $I_{LOOP}$, generating a predetermined supply voltage $V_{SUPPLY}$ from the loop voltage $V_{LOOP}$, and generating a predetermined supply current $I_{SUPPLY}$, with the predetermined supply current $I_{SUPPLY}$ being related to a predetermined impedance characteristic of the bus loop power interface.

ASPECTS

In one aspect of the bus loop power interface, the predetermined supply current $I_{SUPPLY}$ is substantially fixed.

In another aspect of the bus loop power interface, the predetermined supply current $I_{SUPPLY}$ is varying.

In yet another aspect of the bus loop power interface, the impedance control module regulates electrical impedance in the bus loop power interface.

In yet another aspect of the bus loop power interface, the impedance control module further comprises an impedance control line, with the impedance control line being configured to control the predetermined supply current $I_{SUPPLY}$ and control an electrical impedance of the impedance control module.

In yet another aspect of the bus loop power interface, the bus loop power interface further comprises a pair of input terminals and a pair of output terminals, wherein the impedance control module receives the loop current $I_{LOOP}$ from the input terminals and wherein the voltage control module is connected to the pair of output terminals.

In yet another aspect of the bus loop power interface, the voltage control module further comprises a switch mode power supply (SMPS) $U_2$.

In yet another aspect of the bus loop power interface, the impedance control module further comprises a current measuring resistor $R_1$ receiving the loop current $I_{LOOP}$, an op-amp $U_1$ including input terminals across the current measuring resistor $R_1$, and a transistor $Q_1$ biased by the op-amp $U_1$ and receiving the loop current $I_{LOOP}$, with the output of the op-amp $U_1$ controlling an impedance characteristic of the transistor $Q_1$ and controlling the predetermined supply current $I_{SUPPLY}$.

In yet another aspect of the bus loop power interface, the feedback comprises a transistor $Q_2$ that is biased by the loop voltage $V_{LOOP}$ and a feedback resistor $R_2$ connected between the transistor $Q_2$ and ground, with the feedback resistor $R_2$ receiving a feedback current $I_F$ from the transistor $Q_2$, wherein a feedback voltage $V_{FB}$ across the feedback resistor $R_2$ is received by a feedback input FB of the SMPS $U_2$.

In yet another aspect of the bus loop power interface, the SMPS $U_2$ comprises a voltage control module.

In yet another aspect of the bus loop power interface, the current measuring resistor $R_1$, the op-amp $U_1$, and the transistor $Q_1$ comprise an impedance control module.

In yet another aspect of the bus loop power interface, the transistor $Q_2$ and the feedback resistor $R_2$ comprise a feedback.

In yet another aspect of the bus loop power interface, the current measuring resistor $R_1$, the op-amp $U_1$, and the transistor $Q_1$ regulate electrical impedance in the bus loop power interface.

In yet another aspect of the bus loop power interface, the bus loop power interface further comprises an impedance control line configured to control the predetermined supply current $I_{SUPPLY}$ and control an electrical impedance of the impedance control module.

In yet another aspect of the bus loop power interface, the bus loop power interface further comprises an impedance control line coupled to the op-amp $U_1$, with the impedance control line being configured to control a bias voltage of the transistor $Q_1$.

In one aspect of the method, the method maximizes the electrical power available to the bus loop power interface.

In another aspect of the method, the method maximizes the electrical power available to the bus loop power interface while maintaining a substantially high impedance.

In yet another aspect of the method, the method maximizes the electrical power available to the bus loop power interface by maximizing the predetermined supply voltage $V_{SUPPLY}$ and the predetermined supply current $I_{SUPPLY}$.

In yet another aspect of the method, the method further comprises regulating the predetermined supply current $I_{SUPPLY}$ to generate a communication signal.

In yet another aspect of the method, the method further comprises receiving an impedance control input and generating the predetermined supply current $I_{SUPPLY}$ based on the impedance control input.

In yet another aspect of the method, the bus loop power interface comprises a voltage control module receiving a loop voltage $V_{LOOP}$ and generating a predetermined supply voltage $V_{SUPPLY}$, an impedance control module coupled to the voltage control module, with the impedance control module receiving a loop current $I_{LOOP}$ and generating, a predetermined supply current $I_{SUPPLY}$, and a feedback coupled between the voltage control module and the impedance control module, with the feedback providing a feedback signal to the voltage control module that enables the voltage control module to substantially maintain the predetermined supply voltage $V_{SUPPLY}$.

In yet another aspect of the method, the predetermined supply current $I_{SUPPLY}$ is substantially fixed.

In yet another aspect of the method, the predetermined supply current $I_{SUPPLY}$ is varying.

In yet another aspect of the method, the impedance control module further comprises an impedance control line, with the impedance control line being configured to control the predetermined supply current $I_{SUPPLY}$ and control an electrical impedance of the impedance control module.

In yet another aspect of the method, the voltage control module further comprises a switch mode power supply (SMPS) $U_2$.

In yet another aspect of the method, the impedance control module further comprises a current measuring resistor $R_1$ receiving the loop current $I_{LOOP}$, an op-amp $U_1$ including input terminals across the current measuring resistor $R_1$, and a transistor $Q_1$ biased by the op-amp $U_1$ and receiving the loop current $I_{LOOP}$, with the output of the op-amp $U_1$ controlling an impedance characteristic of the transistor $Q_1$ and controlling the predetermined supply current $I_{SUPPLY}$.

In yet another aspect of the method, the feedback further comprises a transistor $Q_2$ that is biased by the loop voltage $V_{LOOP}$ and a feedback resistor $R_2$ connected between the transistor $Q_2$ and ground, with the feedback resistor $R_2$ receiving a feedback current $I_F$ from the transistor $Q_2$, wherein a feedback voltage $V_{FB}$ across the feedback resistor $R_2$ is received by a feedback input FB of the SMPS $U_2$.

DETAILED DESCRIPTION OF THE INVENTION

Figure 1:
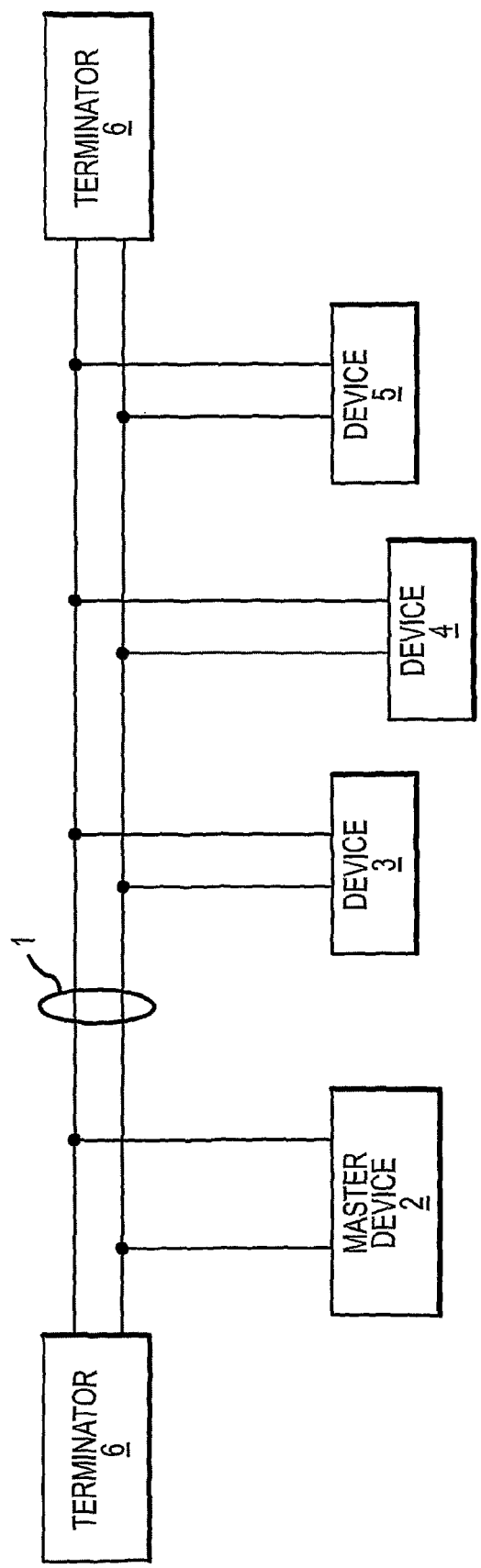
FIG. 1 shows a two-wire bus loop according to the prior art.
Figure 2:
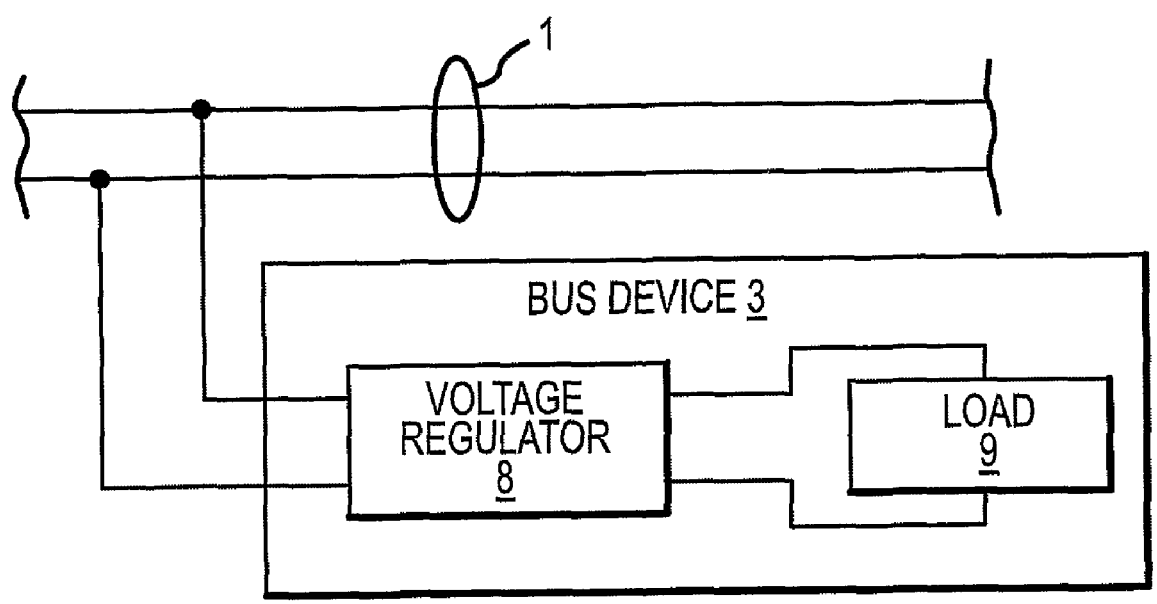
FIG. 2 shows a prior art power regulation scheme for a prior art bus device connected to the bus loop.
Figure 3:
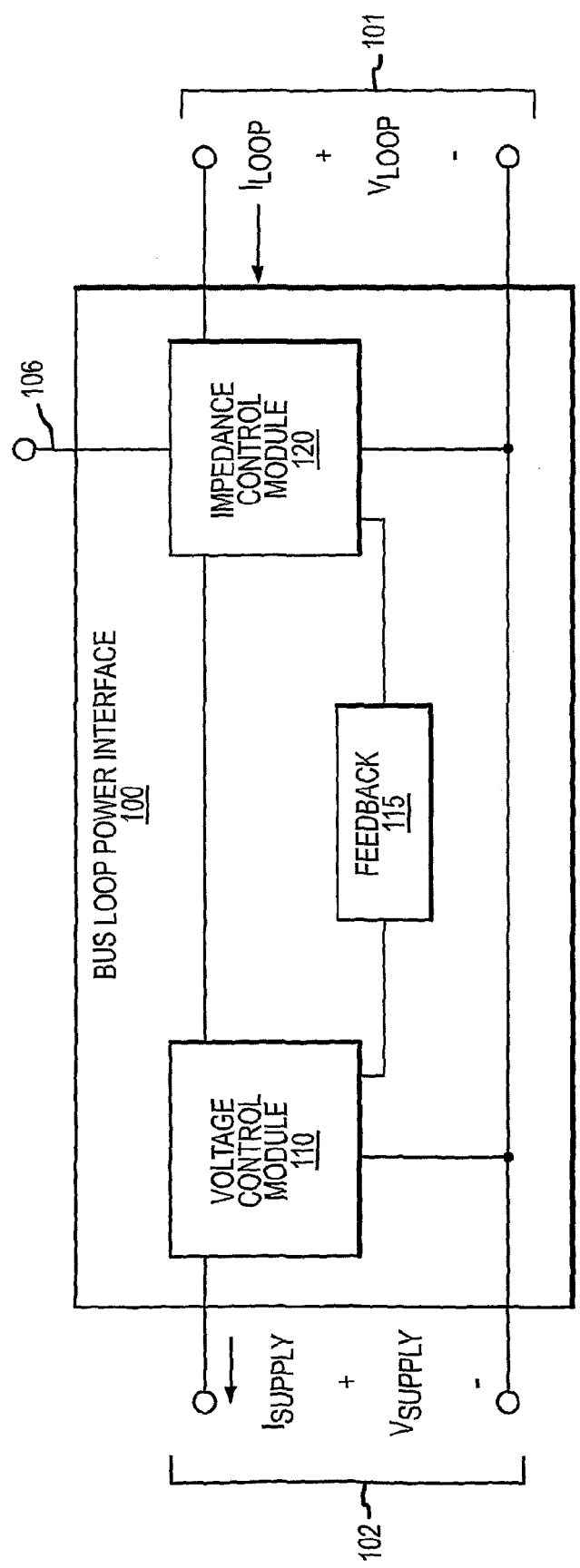
FIG. 3 shows a bus loop power interface according to an embodiment of the invention.
Figure 4:
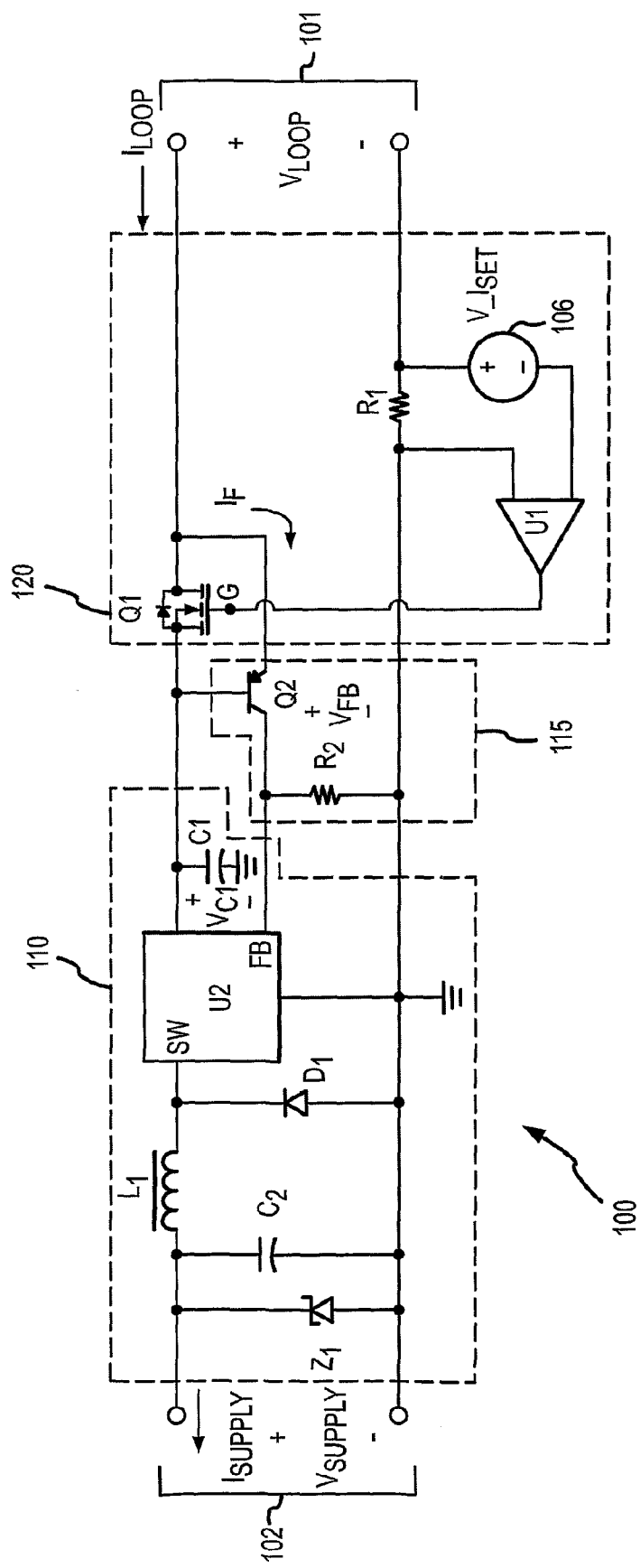
FIG. 4 shows the bus loop power interface according to an embodiment of the invention.

FIGS. 3-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 3 shows a bus loop power interface 100 according to an embodiment of the invention. The bus loop power interface 100 provides electrical power to a bus device attached to an instrument bus loop 1 (not shown). The bus loop power interface 100 can be the only device attached to the bus loop 1 or can be one bus instrument of many.

The bus device in one embodiment comprises a flow meter, such as a Coriolis flow meter or a vibrating densitometer, for example. However, other bus devices are contemplated and are within the scope of the description and claims.

The bus loop power interface 100 includes a voltage control module 110, an impedance control module 120, and a feedback 115 coupled between the voltage control module 110 and the impedance control module 120. The bus loop power interface 100 includes a pair of input terminals 101 configured to be coupled to an bus loop 1 and a pair of output terminals 102 configured to be coupled to a sensor or instrument device (also not shown). The impedance control module 120 receives the loop current $I_{LOOP}$ from the input terminals 101 and the voltage control module 110 is connected to the pair of output terminals 102. The bus loop power interface 100 receives a loop voltage $V_{LOOP}$ from the bus and provides a predetermined supply voltage $V_{SUPPLY}$ at the output terminals 102. In addition, the bus loop power interface 100 receives a loop current $I_{LOOP}$ from the bus and provides a predetermined supply current $I_{SUPPLY}$ at the output terminals 102.

The voltage control module 110 provides the predetermined supply voltage $V_{SUPPLY}$ from the loop voltage $V_{LOOP}$. The voltage control module 110 includes a switch mode power supply (SMPS) in some embodiments. The supply voltage $V_{SUPPLY}$ of the voltage control module 110 (and of the bus loop power interface 100) can comprise a direct current (DC) voltage in some embodiments. Alternatively, the supply voltage $V_{SUPPLY}$ can comprise a DC voltage including a superimposed digital communication signal.

The supply voltage $V_{SUPPLY}$ can be less than the loop voltage $V_{LOOP}$. The supply voltage $V_{SUPPLY}$ can be greater than or equal to the loop voltage $V_{LOOP}$. The supply voltage $V_{SUPPLY}$ can be at a fixed or varying level.

The impedance control module 120 regulates electrical impedance in the bus loop power interface 100. The impedance control module 120 provides the predetermined supply current $I_{SUPPLY}$ from the loop current $I_{LOOP}$. The supply current $I_{SUPPLY}$ is generated by varying the impedance provided by the impedance control module 120. As a result, the impedance of the bus loop power interface 100 can be maintained at a relatively high impedance level.

In some embodiments, the predetermined supply current $I_{SUPPLY}$ produced by the impedance control module 120 is substantially fixed. Alternatively, in other embodiments the predetermined supply current $I_{SUPPLY}$ is varying, such as in embodiments where a varying current is used to generate a communication signal.

In some embodiments, the impedance control module 120 includes an impedance control line 106. The impedance control line 106 is configured to control the predetermined supply current $I_{SUPPLY}$ and control the electrical impedance of the impedance control module 120.

The impedance control line 106 can be used in some embodiments to vary the supply current $I_{SUPPLY}$, such as in embodiments that employ electrical current to generate a communication signal. Alternatively, in other embodiments the impedance control line 106 can comprise a fixed value that generates a substantially fixed impedance value (and therefore a substantially fixed supply current $I_{SUPPLY}$).

The feedback 115 generates feedback from the impedance control module 120 to the voltage control module 110. The feedback 115 provides a feedback signal to the voltage control module 110 that enables the voltage control module 110 to substantially maintain the predetermined supply voltage $V_{SUPPLY}$. The feedback 115 can include a voltage level-feedback, for example, wherein the voltage control module 110 uses the voltage level feedback in order to maintain the supply voltage $V_{SUPPLY}$. In addition or alternatively, the feedback 115 can transfer an error current to the voltage control module 110, wherein the error current generates a feedback voltage that is used by the voltage control module 110 to maintain the supply voltage $V_{SUPPLY}$ (see FIG. 4 and the accompanying text).

The feedback 115 is used to generate and maintain the regulated supply voltage $V_{SUPPLY}$. In addition, the feedback 115 is also used to maximize electrical power output by the bus loop power interface 100 and therefore to achieve a maximum power transfer. The feedback 115 can ensure that the bus loop power interface 100 tracks a specific electrical power operating point. Even when the supply voltage $V_{SUPPLY}$ changes, the bus loop power interface 100 maximizes available power. A bus device coupled to the pair of input terminals 101 may have to operate at a specific supply current $I_{SUPPLY}$ that is determined by a process value. In such a case, the bus loop power interface 100 can still maximize the available power.

The bus loop power interface 100 can be used with any instrument bus, such as a FIELDBUS, a PROFIBUS, or a HART bus, for example. In these applications, a digital communication signal can be superimposed on the supplied electrical power. Alternatively, the bus loop power interface 100 can be used for a 4-20 milliamp (mA) bus loop, for example, wherein the electrical current output is modulated in order to generate a superimposed communication signal.

In some embodiments, the bus loop power interface 100 can be used in intrinsically safe (IS) environments. An IS environment can include vapors, gases, liquids, dust, etc., that presents a fire or explosion hazard. Therefore, an IS compliant bus is limited in available current and/or voltage that it can supply.

Advantageously, the bus loop power interface 100 can maximize delivered electrical power by maximizing both the available voltage and the available current. This is achieved while maintaining a high input impedance. The bus loop power interface 100 will substantially maintain the supply voltage $V_{SUPPLY}$ over various current levels. The bus loop power interface 100 therefore facilitates communication while delivering maximum electrical power.

The bus loop power interface 100 implements a method of controlling electrical power according to an embodiment of the invention. The bus loop power interface 100 receives electrical power from an instrumentation bus at a loop voltage $V_{LOOP}$ and at a loop current $I_{LOOP}$, generates a predetermined supply voltage $V_{SUPPLY}$ from the loop voltage $V_{LOOP}$, and generates a predetermined supply current $I_{SUPPLY}$. The predetermined supply current $I_{SUPPLY}$ is related to a predetermined impedance characteristic of the bus loop power interface.

The method maximizes the electrical power available to the bus loop power interface 100. The method maximizes the electrical power available to the bus loop power interface 100 while maintaining a substantially high impedance. The method maximizes the electrical power available to the bus loop power interface 100 by maximizing the predetermined supply voltage $V_{SUPPLY}$ and the predetermined supply current $I_{SUPPLY}$. This is achieved even where the supply voltage $V_{SUPPLY}$ or the supply current $I_{SUPPLY}$ may be constrained by a process value of the corresponding bus device.

The method can regulate the predetermined supply current $I_{SUPPLY}$ in order to generate a communication signal. The method can receive an impedance control input and can generate the predetermined supply current $I_{SUPPLY}$ based on the impedance control input.

FIG. 4 shows the bus loop power interface 100 according to an embodiment of the invention. The bus loop power interface 100 in this embodiment includes the voltage control module 110, the impedance control module 120, and the feedback 115, as previously discussed.

The voltage control module 110 in this embodiment includes a switch mode power supply (SMPS) $U_2$, an inductor $L_1$, capacitors $C_1$ and $C_2$, a diode $D_1$, and a Zener diode $Z_1$. As previously discussed, the predetermined supply voltage $V_{SUPPLY}$ can comprise a DC voltage that is greater than, equal to, or less than the loop DC voltage $V_{LOOP}$. The capacitor, inductor, and diode components can be chosen to achieve the predetermined supply voltage $V_{SUPPLY}$.

The impedance control module 120 in this embodiment includes an op-amp $U_1$, a resistor $R_1$, a voltage input $V\_I_{set}$, and a transistor $Q_1$. The op-amp $U_1$ includes input terminals across the resistor $R_1$. The transistor $Q_1$ is biased by the op-amp $U_1$. The resistor $R_1$ receives the loop current $I_{LOOP}$ and the transistor $Q_1$ receives the loop current $I_{LOOP}$ and generates a predetermined supply current $I_{SUPPLY}$. The op-amp $U_1$ is configured to measure the voltage across the resistor $R_1$, wherein the voltage is generated by an electrical current (i.e., $I_{LOOP}$) flowing through the resistor $R_1$. The measured current is used to control the gate (G) voltage of the transistor $Q_1$. Changing the voltage bias of the gate of the transistor $Q_1$ changes the source-to-drain impedance of the transistor $Q_1$.

The voltage input $V\_I_{set}$ in some embodiments comprises the impedance control input 106 of FIG. 3. The impedance control line 106 is coupled to the op-amp $U_1$ and can therefore control a bias voltage of the transistor $Q_1$.

The transistor $Q_1$ can comprise a power transistor. In the embodiment shown, the transistor $Q_1$ comprises a field effect transistor (FET) or a metal oxide semiconductor field effect transistor (MOSFET), such as a BSP 149 transistor, available from Infineon Technologies AG. However, any suitable transistor device can be used, and is within the scope of the description and claims.

The feedback 115 in this embodiment includes a transistor $Q_2$ and a feedback resistor $R_2$. The transistor $Q_2$ is biased by the loop voltage $V_{LOOP}$. The feedback resistor $R_2$ is connected between the transistor $Q_2$ and ground. The feedback resistor $R_2$ receives a feedback current $I_F$ from the transistor $Q_2$. A feedback voltage $V_{FB}$ across the feedback resistor $R_2$ is received by a feedback input FB of the SMPS $U_2$. When the actual supply voltage $V_{SUPPLY}$ increases to above a target supply voltage, the bias voltage at the base of the transistor $Q_2$ will increase. If the voltage across the base-collector junction of the transistor $Q_2$ (i.e., $V_{BC}$ of Q2) becomes greater than 0.7 volts, then a positive feedback current $I_{FB}$ will flow through the feedback resistor $R_2$ to ground. This in turn causes the voltage across the feedback resistor $R_2$ to increase and consequently places a higher feedback voltage on the feedback (FB) pin of the SMPS $U_2$. As a result, the supply voltage $V_{SUPPLY}$ will be reduced by the SMPS $U_2$. Conversely, if the actual supply voltage $V_{SUPPLY}$ drops below the predetermined supply voltage, the feedback voltage at the FB pin will decrease and the SMPS $U_2$ will bring the actual supply voltage $V_{SUPPLY}$ up to substantially the same level as the predetermined target supply voltage $V_{SUPPLY}$. The transistor $Q_2$ and the feedback resistor $R_2$ enable the SMPS $U_2$ to substantially maintain the predetermined supply voltage $V_{SUPPLY}$.

The invention can advantageously maximize available power at the pair of output terminals 102. The power can be represented as:

$$P = [V_{LOOP} - (V_{BE} \text{ of } Q_2)] * I_{LOOP} * (E \text{ of } U_2) \qquad (1)$$

where ($V_{BE}$ of $Q_2$) is the voltage across the base-emitter junction of transistor $Q_2$ and where (E of $U_2$) is the switching efficiency of the SMPS $U_2$. The term $[V_{LOOP} - (V_{BE} \text{ of } Q_2)]$ comprises the voltage $V_{C1}$ across the capacitor $C_1$, and is equivalent to the supply voltage $V_{SUPPLY}$.

In one embodiment, the transistor Q2 comprises a bipolar junction transistor (BJT), such as a BC 859 transistor, available from Fairchild Semiconductor Corporation. However, it should be understood that other transistors are contemplated and are within the scope of the description and claims.

The bus loop power interface and method according to the invention can be employed according to any of the embodiments in order to provide several advantages, if desired. The invention provides a regulated electrical voltage. The invention provides a regulated electrical current. The invention provides a high input impedance. The invention provides an ability to control current. The invention provides an ability to control impedance. The invention provides a maximized electrical power.

What is claimed is:

1. A bus loop power interface (100), comprising:
 a voltage control module (110) receiving a loop voltage ($V_{LOOP}$) and generating a predetermined supply voltage ($V_{SUPPLY}$);
 an impedance control module (120) coupled to the voltage control module (110), with the impedance control module (120) receiving a loop current ($I_{LOOP}$) and generating a predetermined supply current ($I_{SUPPLY}$); and
 a feedback (115) coupled between the voltage control module (110) and the impedance control module (120), with the feedback (115) providing a feedback signal to the voltage control module (110) that enables the voltage control module (110) to substantially maintain the predetermined supply voltage ($V_{SUPPLY}$).

2. The bus loop power interface (100) of claim 1, wherein the predetermined supply current ($I_{SUPPLY}$) is substantially fixed.

3. The bus loop power interface (100) of claim 1, wherein the predetermined supply current ($I_{SUPPLY}$) is varying.

4. The bus loop power interface (100) of claim 1, with the impedance control module (120) regulating electrical impedance in the bus loop power interface (100).

5. The bus loop power interface (100) of claim 1, with the impedance control module (120) further comprising an impedance control line (106), with the impedance control line (106) being configured to control the predetermined supply current ($I_{SUPPLY}$) and control an electrical impedance of the impedance control module (120).

6. The bus loop power interface (100) of claim 1, with the bus loop power interface (100) further comprising:
   a pair of input terminals (101); and
   a pair of output terminals (102);
   wherein the impedance control module (120) receives the loop current ($I_{LOOP}$) from the input terminals (101) and wherein the voltage control module (110) is connected to the pair of output terminals (102).

7. The bus loop power interface (100) of claim 1, with the voltage control module (110) further comprising a switch mode power supply (SMPS) ($U_2$).

8. The bus loop power interface (100) of claim 1, with the impedance control module (120) further comprising:
   a current measuring resistor ($R_1$) receiving the loop current ($I_{LOOP}$);
   an op-amp ($U_1$) including input terminals across the current measuring resistor ($R_1$);
   a transistor ($Q_1$) biased by the op-amp ($U_1$) and receiving the loop current ($I_{LOOP}$) with the output of the op-amp ($U_1$) controlling an impedance characteristic of the transistor ($Q_1$) and controlling the predetermined supply current ($I_{SUPPLY}$).

9. The bus loop power interface (100) of claim 7, with the feedback (115) comprising:
   a transistor ($Q_2$) that is biased by the loop voltage ($V_{LOOP}$); and
   a feedback resistor ($R_2$) connected between the transistor ($Q_2$) and ground, with the feedback resistor ($R_2$) receiving a feedback current ($I_F$) from the transistor ($Q_2$), wherein a feedback voltage ($V_{FB}$) across the feedback resistor ($R_2$) is received by a feedback input (FB) of the SMPS ($U_2$).

10. A bus loop power interface (100), comprising:
    a switch mode power supply (SMPS) ($U_2$) receiving a loop voltage ($V_{LOOP}$) and generating a predetermined supply voltage ($V_{SUPPLY}$);
    a current measuring resistor ($R_1$) receiving a loop current ($I_{LOOP}$);
    an op-amp ($U_1$) including input terminals across the current measuring resistor ($R_1$);
    a transistor ($Q_1$) biased by the op-amp ($U_1$), with the transistor ($Q_1$) receiving the loop current ($I_{LOOP}$) and generating a predetermined supply current ($I_{SUPPLY}$), with the output of the op-amp ($U_1$) controlling an impedance characteristic of the transistor ($Q_1$) and controlling the predetermined supply current ($I_{SUPPLY}$);
    a transistor ($Q_2$) coupled to the SMPS ($U_2$), with the transistor ($Q_2$) being biased by the loop voltage ($V_{LOOP}$); and
    a feedback resistor ($R_2$) connected between the transistor ($Q_2$) and ground, with the feedback resistor ($R_2$) receiving a feedback current ($I_F$) from the transistor ($Q_2$), wherein a feedback voltage ($V_{FB}$) across the feedback resistor ($R_2$) is received by a feedback input (FB) of the SMPS ($U_2$) and wherein the transistor ($Q_2$) and the feedback resistor ($R_2$) enable the SMPS ($U_2$) to substantially maintain the predetermined supply voltage ($V_{LOOP}$).

11. The bus loop power interface (100) of claim 10, wherein the predetermined supply current ($I_{SUPPLY}$) is substantially fixed.

12. The bus loop power interface (100) of claim 10, wherein the predetermined supply current ($I_{SUPPLY}$) is varying.

13. The bus loop power interface (100) of claim 10, with the SMPS ($U_2$) comprising a voltage control module (110).

14. The bus loop power interface (100) of claim 10, with the current measuring resistor ($R_1$), the op-amp ($U_1$), and the transistor ($Q_1$) comprising an impedance control module (120).

15. The bus loop power interface (100) of claim 10, with the transistor ($Q_2$) and the feedback resistor ($R_2$) comprising a feedback (115).

16. The bus loop power interface (100) of claim 10, with the current measuring resistor ($R_1$), the op-amp ($U_1$), and the transistor ($Q_1$) regulating electrical impedance in the bus loop power interface (100).

17. The bus loop power interface (100) of claim 10, further comprising an impedance control line (106) being configured to control the predetermined supply current ($I_{SUPPLY}$) and control an electrical impedance of the impedance control module (120).

18. The bus loop power interface (100) of claim 10, further comprising an impedance control line (106) coupled to the op-amp ($U_1$), with the impedance control line (106) being configured to control a bias voltage of the transistor ($Q_1$).

19. A method of controlling electrical power in a bus loop power interface, the method comprising:
    a voltage control module receiving electrical power from an instrumentation bus at a loop voltage ($V_{LOOP}$) and at a loop current ($I_{LOOP}$);
    the voltage control module generating a predetermined supply voltage ($V_{SUPPLY}$) from the loop voltage ($V_{LOOP}$); and
    an impedance control module generating a predetermined supply current ($I_{SUPPLY}$), with the predetermined supply current ($I_{SUPPLY}$) being related to a predetermined impedance characteristic of the bus loop power interface;
    with the impedance control module providing a feedback signal to the voltage control module that enables the voltage control module to substantially maintain the predetermined supply voltage ($V_{SUPPLY}$).

20. The method of claim 19, with the method maximizing the electrical power available to the bus loop power interface.

21. The method of claim 19, with the method maximizing the electrical power available to the bus loop power interface while maintaining a substantially high impedance.

22. The method of claim 19, with the method maximizing the electrical power available to the bus loop power interface by maximizing the predetermined supply voltage ($V_{SUPPLY}$) and the predetermined supply current ($I_{SUPPLY}$).

23. The method of claim 19, further comprising regulating the predetermined supply current ($I_{SUPPLY}$) to generate a communication signal.

24. The method of claim 19, further comprising:
    receiving an impedance control input; and
    generating the predetermined supply current ($I_{SUPPLY}$) based on the impedance control input.

25. The method of claim 19, wherein the predetermined supply current ($I_{SUPPLY}$) is substantially fixed.

26. The method of claim 19, wherein the predetermined supply current ($I_{SUPPLY}$) is varying.

27. The method of claim 19, with the impedance control module further comprising an impedance control line, with the impedance control line being configured to control the predetermined supply current ($I_{SUPPLY}$) and control an electrical impedance of the impedance control module.

28. The method of claim 19, with the voltage control module further comprising a switch mode power supply (SMPS) ($U_2$).

29. The method of claim 19, with the impedance control module further comprising:
- a current measuring resistor ($R_1$) receiving the loop current ($I_{LOOP}$);
- an op-amp ($U_1$) including input terminals across the current measuring resistor ($R_1$); and
- a transistor ($Q_1$) biased by the op-amp ($U_1$) and receiving the loop current ($I_{LOOP}$), with the output of the op-amp ($U_1$) controlling an impedance characteristic of the transistor ($Q_1$) and controlling the predetermined supply current ($I_{SUPPLY}$).

30. The method of claim 19, with the feedback further comprising:
- a transistor ($Q_2$) that is biased by the loop voltage ($V_{LOOP}$); and
- a feedback resistor ($R_2$) connected between the transistor ($Q_2$) and ground, with the feedback resistor ($R_2$) receiving a feedback current ($I_F$) from the transistor ($Q_2$), wherein a feedback voltage ($V_{FB}$) across the feedback resistor ($R_2$) is received by a feedback input (FB) of the SMPS ($U_2$).

* * * * *